United States Patent [19]
Brumm

[11] 3,972,364
[45] Aug. 3, 1976

[54] PRESSURE SURGE RELIEF SYSTEM

[75] Inventor: Richard S. Brumm, Orinda, Calif.

[73] Assignee: Grove Valve and Regulator Company, Oakland, Calif.

[22] Filed: Mar. 6, 1975

[21] Appl. No.: 555,785

Related U.S. Application Data

[63] Continuation of Ser. No. 473,001, May 24, 1972, abandoned.

[52] U.S. Cl. ............................ 137/485; 137/492
[51] Int. Cl.² ............... F16K 31/126; F16K 31/365
[58] Field of Search ............... 137/492, 489.5, 488, 137/489, 494, 525; 251/5; 92/90; 137/485, 492.5

[56] References Cited
UNITED STATES PATENTS

| | | | |
|---|---|---|---|
| 2,353,143 | 7/1944 | Bryant | 137/492 |
| 2,877,791 | 3/1959 | Rich | 137/492 |
| 3,272,470 | 9/1966 | Bryant | 251/5 |

*Primary Examiner*—Martin P. Schwadron
*Assistant Examiner*—Robert J. Miller
*Attorney, Agent, or Firm*—Melvin R. Stidham

[57] ABSTRACT

A pressure surge relief system including a valve which is opened to relieve the pipeline when line pressure overcomes a pilot chamber pressure. A pilot load duct with a variable orifice device therein connects the chamber to the pipeline. In the event of a surge, the orifice retards pressure build-up in the chamber so that it will be overcome by higher pressure in the pipeline. Pressure responsive means makes the orifice device more restrictive as pressure increases to produce a pressure lag at the control chamber even at lower velocities.

11 Claims, 5 Drawing Figures

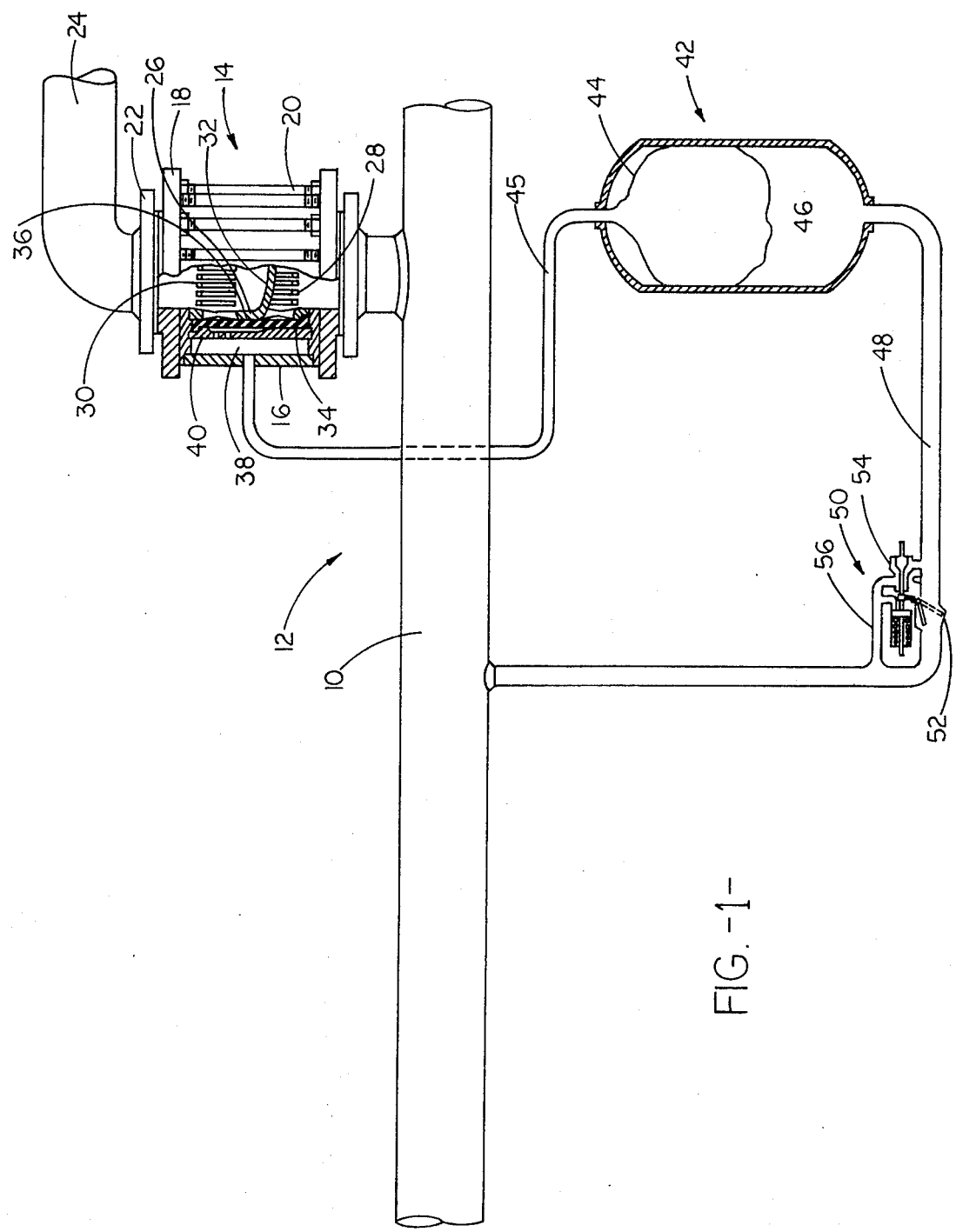
FIG. -1-

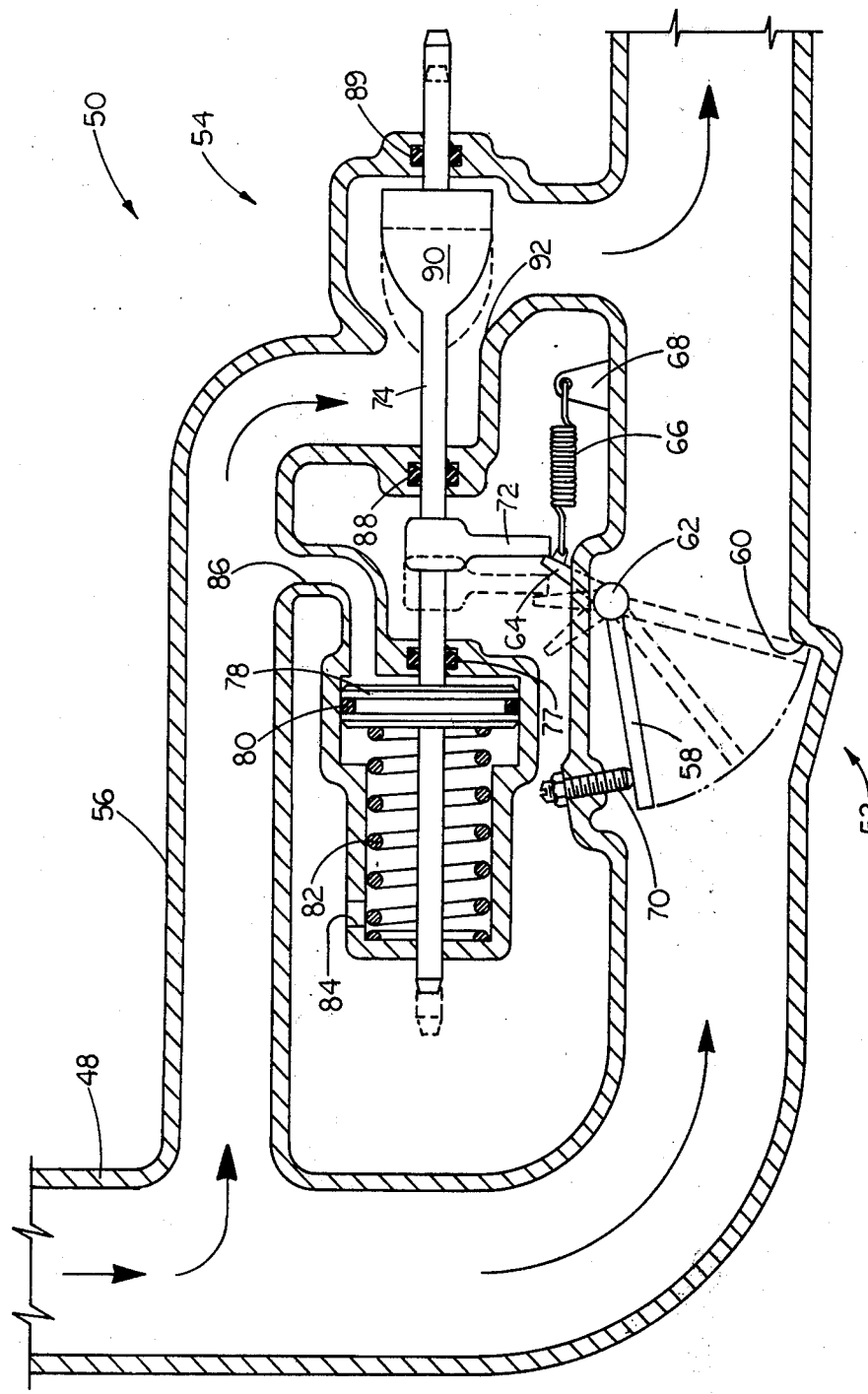

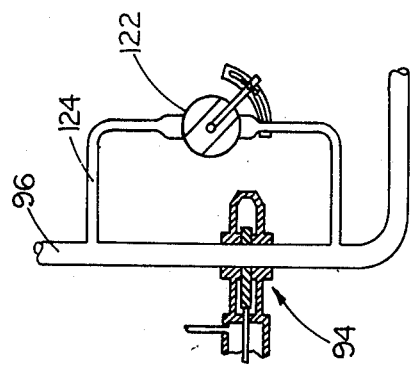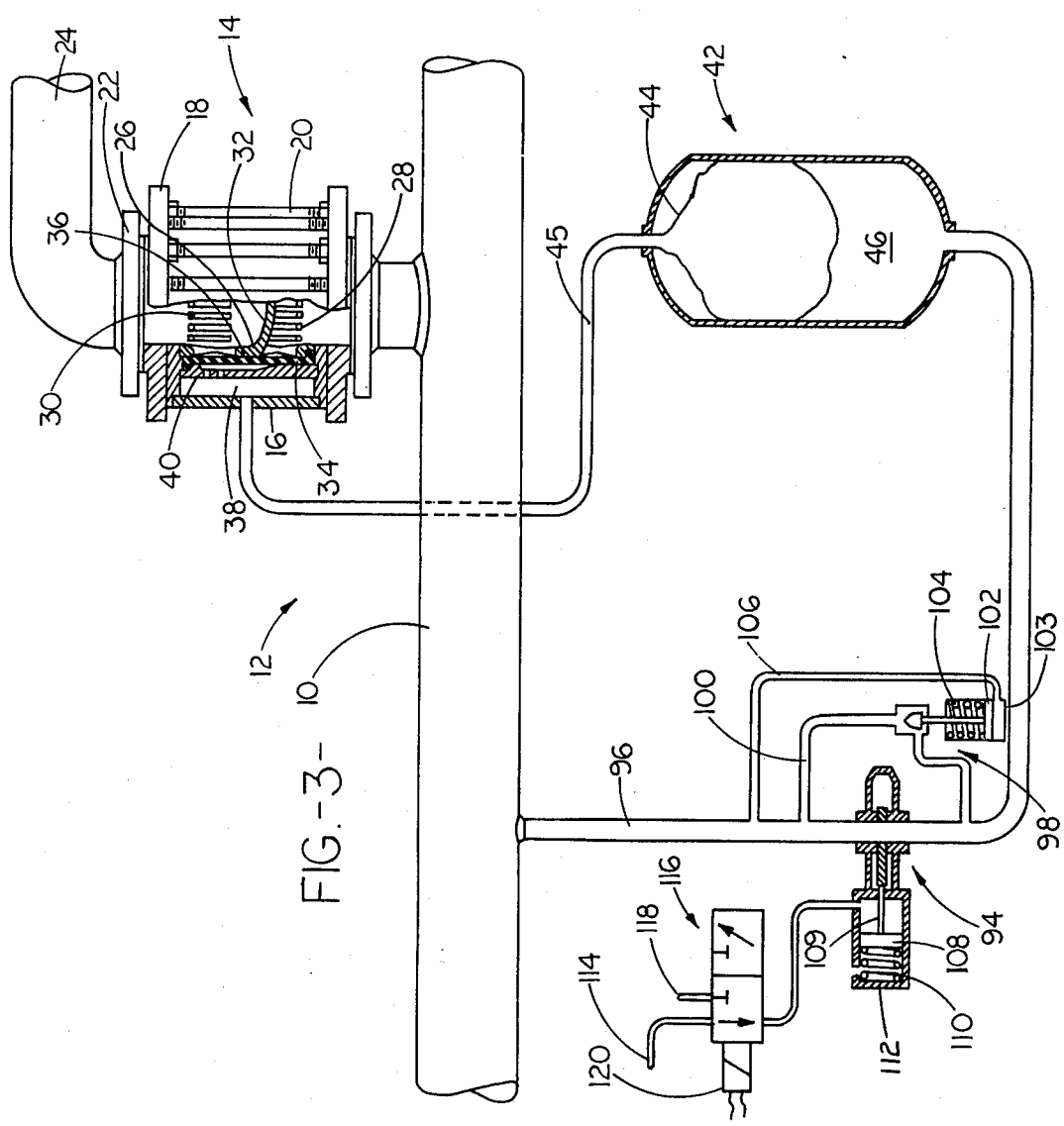

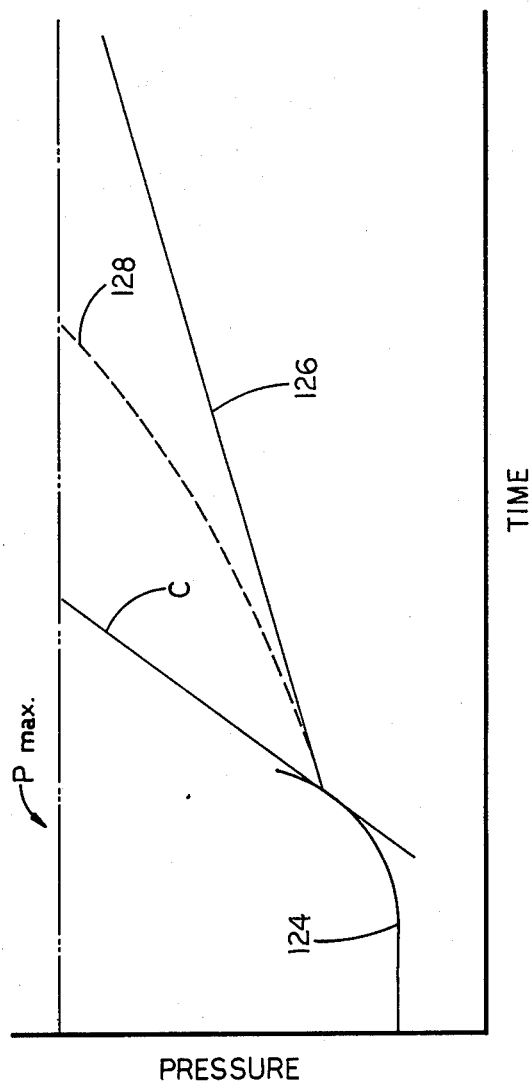
FIG.-5-

PRESSURE SURGE RELIEF SYSTEM

RELATED APPLICATION

This application is a continuation of my pending application Ser. No. 473,001, filed May 24, 1972, now abandoned for "Pressure Surge Relief System."

BACKGROUND OF THE INVENTION

In pipeline operation, starting and stopping a pump or opening or closing a valve will produce a surge in pressure which, under certain circumstances, could build up to dangerous proportions and may cause severe pipeline damage. In some pipeline installations, valves are provided which open at a predetermined, dangerously high pressure. However, such valves are necessarily installed at locations along the pipeline where surges are likely to be of greatest intensity, e.g., at the bottom of a steep grade, and not necessarily at locations convenient for inspection and servicing.

Generally, such valves relieve a pipeline surge by dumping the surge-producing flow into a reservoir from which the fluid must subsequently be removed. Accordingly, it is desirable to avoid dumping the fluid to the reservoir unless the surge is a potentially harmful one. For example, the shut-down of a single pump at a pumping station will ordinarily produce a surge, but the intensity of the surge may be well within the design capabilities of the pipeline.

OBJECTS OF THE INVENTION

It is an object of this invention to provide a surge relief system which may be installed at a convenient location along the pipeline.

It is a further object of this invention to provide a surge relief system which operates in response to rate of pressure increase, irrespective of pressure level, to anticipate a dangerous surge.

It is a further object of this invention to provide a surge relief system which becomes operative only when a predetermined rate of increase is reached.

It is a further object of this invention to provide a simple and reliable device for detecting and relieving pipeline surges.

It is a further object of this invention to provide a surge relief system that does not dump harmless pressure surges.

Other objects and advantages of this invention will become apparent from the description to follow when read in conjunction with the accompanying drawings.

BRIEF SUMMARY OF THE INVENTION

A component of the pressure surge relief system of this invention is a valve which opens automatically when line pressure overcomes the pressure of fluid in a control chamber to dump fluid in the line into a reservoir. Suitable for this purpose is an expansible tube valve comprising a flexible tube which is stretched over a barrier between inlet and outlet slots, with a jacket around the tube functioning as the control chamber. The control chamber is normally maintained at line pressure through a branch line from the liquid pipeline to an accumulator which is turn delivers a gas at the same pressure to the chamber. A variable orifice device in the branch line becomes more restrictive with an increase in pressure to compensate for lower velocity surges at higher pressures. In one embodiment of the variable orifice device, there is a swing check or clapper valve in the branch line and a poppet valve in a bypass line. Pressure responsive means control both the full open position of the clapper and the position of the poppet. A surge in the line in excess of a predetermined intensity, will result in a flow velocity, and hence a pressure drop across the swing check valve sufficient to overcome a spring force and slam the clapper closed, enabling flow only through the restrictive bypass line and poppet valve. Because a surge at relatively high pressures results in lower velocity flow than a like surge at lower pressures, the pressure compensating device makes flow through the poppet valve even more restrictive to produce a pressure lag, even at the lower velocities. Hence, the pressure surge moving through the pipeline reaches the main surge relief valve while the pressure in the control chamber lags behind. As a result, the control pressure is overcome by line pressure, causing the valve to open and relieve the surge to a reservoir.

In a second embodiment an on-off valve in the branch line is closed automatically upon detection of a condition, e.g., an undue rate of pressure increase, the closing of a valve, etc., anticipatory of a pressure surge, whereby flow to the control chamber is, again, through the bypass line and the restrictive, pressure-compensated poppet valve. In a third embodiment for use in systems wherein dangerously high pressure surges are not experienced a simple variable orifice throttle valve may be substituted for the pressure-compensated poppet valve.

BRIEF DESCRIPTION OF THE DRAWINGS

In the drawings:

FIG. 1 is a schematic view of a first embodiment of a surge relief system embodying features of this invention;

FIG. 2 is a section view of a control valve forming a part of the system;

FIG. 3 shows a second embodiment of a surge relief system;

FIG. 4 shows a third embodiment of a surge relief system; and

FIG. 5 is a series of performance curves.

DESCRIPTION OF A PREFERRED EMBODIMENT

The Embodiment of FIGS. 1 and 2

Referring to FIG. 1 with greater particularity, there is shown a pipeline 10 designed to transport a liquid under conditions which could produce a sudden surge in pressure as when a pump (not shown) is activated or deactivated, or when a valve is opened or closed. The surge relieving system 12 of this invention is designed to relieve surges whenever the rate of pressure change exceeds a given level, indicating a dangerous surge, even though the level of pressure at the location of the surge relieving system is not at a dangerous level. Such pressure surges are relieved through a valve 14 which opens automatically when the line pressure exceeds the control pressure in the chamber. A suitable valve for this purpose may be of the type shown in Bryant U.S. Pat. No. 3,272,470 granted Sept. 13, 1966, comprising a cylindrical body 16 clamped between two closure plates 18 as by means of studs 20. The closure plates are, in turn, secured by any conventional means, to complementary flanges 22 in a pipeline branch 24 with the output thereof directly connected to a storage reservoir (not shown). A slotted core 26 is carried within the body 16 and includes spaced, circumferential rows of inlet and outlet slots 28 and 30 on opposite sides of an intermediate barrier 32. A flexible, expansible tube 34 is stretched around the cylindrical sealing surface 36 of the barrier 32, normally to prevent flow from the inlet slots 28 to the outlet slots 30. A pilot control pressure is normally contained within the chamber 38 and a restraining sleeve 40 with perforations therein limits the expansible of the rubber tube. The capacious chamber 38 provides plenty of volume for compression of the pilot gas without requiring evacuation thereof, whereby the surge relief valve 14 will open quickly should pipeline pressure overcome jacket pressure, such pipeline pressure being asserted against the interior of the flexible tube 34 through the upstream slots 28.

In operation, the control or pilot gas in the jacket 38 is normally at a level equal to that of the fluid in the pipeline 10 whereby the hoop tension of the stretched tube will maintain a seal around the cylindrical surface 36 of the barrier 32. However, should the pipeline pressure exceed that in the jacket 38, the expansible tube 34 will expand and permit flow through the upstream slots 28, around the barrier 32 and through the downstream slots 32 to the outlets, whereby a quantity of fluid producing the surge will be diverted through line 24 to a reservoir, thus relieving pressure in the pipeline 10 itself.

The fluid in the control jacket 38 is a gas, which being compressible, enables a rapid valve response should a pressure surge occur. The source of gas is in an accumulator 42 wherein the gas may be contained in a bag 44 within a chamber 46 which is exposed to a liquid at line pressure introduced into the accumulator chamber 46 through a pilot set branch line 48. Hence, the pilot pressure in chamber 38 is normally at the pressure in the pipeline 10, and any variations which occur in the pilot set branch line 48 will also be transmitted to the gas in the bag 44 and jacket supply line 45 to maintain the flexible tube 34 sealed despite pressure variations, within a tolerable range.

Installed in the branch line 48 is a variable orifice device 50 including a large capacity valve 52 adapted to regulate flow in a bypass line 56.

Referring now to FIG. 2, the variable orifice device 50 is shown in larger scale and comprises, as the high capacity valve 52, a clapper 58 which is movable from its full open position shown in solid lines to a closed position, shown in phantom, wherein it is in engagement with the seat 60. The clapper shaft 62 extends outside of the valve body 52, and an arm 64 thereon is biased in a clockwise direction by a spring 66 normally to hold the clapper 58 in its full open position. The other end of the spring 66 is anchored to a bracket 68. An adjustment screw 70 establishes the full open position of the clapper 58. Also engagable with the clapper pivot arm 64 is a pusher arm 72 carried on a piston rod 74 which extends into a cylinder 76 wherein it is sealed at 77.

The piston 78 is sealed in the cylinder 76 as by means of an O-ring 80 and biased toward the right in FIG. 2 by means of a relatively strong spring 82. A vent 84 relieves the cylinder 76 to the left of the piston 78, and a duct 86 opens into the cylinder to the right of the piston 78 from any convenient place in the pilot set branch line 48, as for example the bypass conduit 56. The piston rod extends to the right in FIG. 2 into the low capacity valve 54 wherein it is sealed, as by means of O-rings 88 and 89. Carried on the piston rod 74 is a poppet valve 90 which is movable into engagement with a seat 92.

In operation, with liquid flowing through the pipeline at a steady pressure level, there is no flow in the branch line 48 and, at relatively low pressures, the large capacity clapper valve 52 remains in its full open position shown in FIG. 2 in solid lines. Should there be an increase in pressure, flow will commence through the branch line 48 and bypass line 56 into the sensing duct 86 forcing the piston 78 to the left in FIG. 1 whereby the pusher arm 72 on the piston rod 74 will pivot the clapper set arm 64 counterclockwise to establish a new full open position of the clapper 58, as shown in the intermediate position in phantom. A surge in pressure will result in a velocity increase through the clapper valve 52, causing a pressure drop. The spring 66 is set to resist pressure drops across the valve 52 which result from harmless surges, but when the velocity, and hence pressure drop is great enough, the spring 66 will be overcome and the clapper will slam shut. A pressure increase in branch line 48 will, in addition to acting on the clapper 58, bias the piston 80 to the left in opposition to the spring 82 to pivot the clapper counterclockwise and establish a new full open set position of the pusher arm 72.

Should the pressure in the pipeline 46 stabilize at the elevated level, flow in the closed branch line 48 will cease and the clapper will open under force of the spring 66 to its newly set position. This provides a more restrictive flow path with the result that a pressure drop adequate to overcome the spring 66 will occur at even lower velocities. Hence, the spring-biased piston 78 constitutes a means of compensating for the lower velocities of like surges occurring at higher pressures.

In the event that a surge is at a level sufficient to close the clapper 58 all flow in the branch line 48 is through the bypass line 56 and poppet valve 54. The throttled flow around the poppet 90 is retarded to produce a pressure lag at the accumulator 52 and, therefore, in the jacket 38 whereby the surge of pressure arriving at the surge relief valve 14 ahead of the lagging increased control pressure, overcomes the jacket pressure and is dumped through the branch pipeline 24.

Since the poppet 90 is carried on the piston rod 74 it, too, moves to the left with the piston 78, in response to pressure increases, closer to the seat 92 making flow through the valve even more restricted. This, again, retards the surge through the bypass line 56 even more to produce a pressure lag, even at the lower velocities experienced at higher pressure ranges.

The Embodiment of FIG. 3

In the embodiment of FIG. 3, an on-off valve 94, such as a gate valve, is installed in a pilot set branch line 96 and a poppet valve 98 orifice is provided in a low capacity bypass line 100 around it. A piston 102 carried in a cylinder 103 operates the poppet valve 98 in opposition to a spring 104, the piston being pressure responsive to the pressure of fluid introduced through a sensing duct 106.

The on-off valve 94 is also operated by a piston 108, which is carried on the gate valve stem 109, and which is normally biased in open position against a spring 110 by means of a pressure fluid in the cylinder 112. Gas from a suitable source (not shown) is directed through a duct 114 to a control valve 116. In the position of the control valve shown, the cylinder 112 is in open communication with the gas supply duct 114 and the vent 118 is blocked off whereby the piston 108 is forced to the left in opposition to the spring 90 to hold the pilot pressure set valve 94 in its open position shown. The control valve 116 is intended to be operated in response to a predetermined change in conditions, as for example, the closing of one or more valves with an anticipated pressure surge. When such circumstances occur, the control valve is moved to the left by the solenoid 120 allowing the control cylinder 112 to be relieved through the vent 118, whereby all flow in the pilot set branch line 96 is directed through the bypass line 100 and through the variable orifice poppet valve 98. As in the embodiment of FIGS. 1 and 2 as pressure increase the piston 102 overcomes the spring 104 to make the orifice even more restrictive to compensate for the lower velocities of surges at high pressure levels.

The Embodiment of FIG. 4

The simplified embodiment of FIG. 4 is intended for use in systems wherein dangerously high pressure surges are not experienced and comprises a simple variable orifice valve 122 in a bypass line 124 around the on-off valve 94.

Referring now to FIG. 5, curves are plotted to show the increases in pressure of surges with time, the line C representing the critical rate of pressure increase which should not be exceeded. With a simple throttle valve the rate of pressure rise follows a non-uniform curve, as exemplified by the curve 124, eventually reaching a slope which exceeds the critical C. With the surge relief systems of FIGS. 1 and 3 it is deemed desirable to follow this curve at low, relatively safe pressure levels until the critical curve C is reached. Thereafter, with the pressure compensated low capacity valves 54 (FIG. 2) and 98 (FIG. 3) assuming control, the rate of pressure increase follows the safe uniform rate exemplified by the substantially straight line 126. Hence, the double orifice, pressure compensated valves 54 and 98 allow an initial high rate of pressure increase to avoid unnecessary surge relieving, and then control the surge at a lower, substantially uniform rate.

If, as in the embodiment of FIG. 5, a single throttle valve is employed in the low capacity bypass line, the rate of pressure increase would again follow a non-uniform curve 128. However, this is satisfactory where under normal circumstances the pressure increase will not exceed the critical rate. Hence when curve 128 reaches the Pmax line, which represents the maximum pressure which can be generated within the pipeline under any circumstances, it still has not achieved the critical slope C.

While this invention has been described in conjunction with preferred embodiments thereof, it is obvious that modifications and changes therein may be made by those skilled in the art without departing from the spirit and scope of this invention.

What is claimed as invention is:

1. A pressure surge relief system for a liquid-transporting pipeline comprising:
   a surge relief line adapted for connection from a pipeline to a low pressure zone;
   a surge reliever valve in said surge relief line;
   a pressure responsive member operating said surge reliever valve;
   a chamber exposed to said pressure-responsive member so that fluid therein biases said pressure-responsive member in one direction to close said surge reliever valve;
   means for exposing said pressure-responsive member to fluid in said surge relief line to bias it in the opposite direction;
   a pilot load duct adapted to be connected to said pipeline;
   means for maintaining the pressure in said chamber at the pressure in said pilot load duct;
   a large capacity control valve in said pilot load duct;
   a bypass line around said control valve;
   an orifice device in said bypass line; and
   means responsive to surge characteristic in said pipeline for closing said control valve.

2. The pressure surge relief system defined by claim 1 including:
   means on said orifice device for varying the flow capacity thereof.

3. The pressure surge relief system defined by claim 1 wherein said orifice device comprises:
   a housing having a flow passageway therethrough;
   a flow blocking means movable in said housing between minimum and maximum flow-restricting positions; and
   means responsive to pressure increases in said pilot load duct for moving said blocking means toward said maximum flow-restricting position.

4. The pressure surge relief system defined by claim 1 wherein said orifice device comprises:
   a housing having a flow passageway therethrough;
   a valve seat around said flow passageway;
   flow blocking means movable in said housing toward and away from said valve seat;
   biasing means urging said blocking means away from said valve seat; and
   means responsive to pressure in said pilot duct opposing said biasing means.

5. The pressure surge relief system defined by claim 1 wherein said large capacity control valve comprises:
   a valve body having a flow conduit therethrough;
   a valve seat around said flow conduit;
   a valve clapper pivotable in said valve body from an open position free of said valve seat to a closed position in engagement therewith;
   a pressure responsive member biasing said clapper toward said closed position;
   duct means bringing said member into communication with said flow conduit; and
   first spring means opposing said pressure responsive member.

6. The pressure surge relief system defined by claim 5 wherein:
   said pressure responsive member is a piston;
   and including:
   a one-way connection between said piston and said clapper leaving said clapper free to move to said closed position free of said piston; and
   second spring means biasing clapper toward said open position.

7. A pressure surge relief system for liquid-transporting pipeline comprising:
   a surge relief line adapted for connection from a pipeline to a low pressure zone;
   a surge reliever valve in said surge relief line;
   a pressure responsive member for operating said surge reliever valve;
   a chamber exposed to said pressure-responsive member so that fluid therein biases said pressure-responsive member in one direction to close said surge reliever valve;

biasing means to augment the pressure of fluid in said chamber;

means for exposing said pressure-responsive member to fluid on the upstream side of said surge reliever valve to bias said member in the opposite direction;

a pilot load line adapted to be connected to said pipeline;

means for maintaining the pressure in said chamber at the pressure in said pilot load line; and flow restriction means in said pilot load line for producing a pressure drop therealong in response to a flow surge therethrough;

said last-named means being sufficiently restrictive that pressure increases in said pipeline will reach the upstream side of said surge reliever valve before same will reach said chamber to produce a pressure differential to overcome said biasing means only in the event such pressure increase is at an excessive rate, but having sufficient capacity that pressure increases at an acceptable rate will reach said chamber before said biasing means can be overcome.

8. The pressure surge relief system defined by claim 7 wherein said last-named means comprises:
an orifice device.

9. The pressure surge relief system defined by claim 7 wherein said last-named means comprises:
a variable orifice device.

10. The pressure surge relief system defined by claim 9 wherein said variable orifice device comprises:
a housing having a flow passageway therethrough;
flow blocking means movable in said housing between minimum and maximum flow-restricting positions; and
means responsive to a pressure increase upstream of said flow blocking means for moving said means toward said maximum flow-restricting position.

11. The pressure surge relief system defined by claim 10 wherein said last-named means comprises:
a cylinder;
a piston in said cylinder carrying said flow blocking means;
biasing means urging said piston to move said flow blocking means toward said minimum flow-restricting positions; and
duct means for introducing fluid upstream of said flow blocking means to said cylinder in opposition to said biasing means.

* * * * *